(12) United States Patent
Downing

(10) Patent No.: US 8,935,958 B2
(45) Date of Patent: Jan. 20, 2015

(54) MUZZLE VELOCITY SENSOR

(75) Inventor: Warren James Downing, Ottawa (CA)

(73) Assignee: DRS Technologies Canada, Ltd., Kanata, Ontario (CA)

( * ) Notice: Subject to any disclaimer, the term of this patent is extended or adjusted under 35 U.S.C. 154(b) by 337 days.

(21) Appl. No.: 13/300,399

(22) Filed: Nov. 18, 2011

(65) Prior Publication Data

US 2012/0125092 A1    May 24, 2012

Related U.S. Application Data

(60) Provisional application No. 61/416,262, filed on Nov. 22, 2010.

(51) Int. Cl.
*G01L 5/14* (2006.01)
*F41A 9/62* (2006.01)
*G01P 3/66* (2006.01)

(52) U.S. Cl.
CPC .. *G01L 5/14* (2013.01); *G01P 3/665* (2013.01)
USPC ................................. 73/167; 42/1.01; 42/1.02

(58) Field of Classification Search
USPC ............. 73/167, 488, 489, 492, 495; 42/1.01, 42/1.02, 1.03
See application file for complete search history.

(56) References Cited

U.S. PATENT DOCUMENTS

| | | | |
|---|---|---|---|
| 4,030,097 A | 6/1977 | Gedeon | |
| 4,483,190 A * | 11/1984 | Cornett | 73/167 |
| 4,486,710 A | 12/1984 | Schmidt | |
| 4,589,610 A * | 5/1986 | Schmidt | 244/3.19 |
| 5,140,329 A * | 8/1992 | Maughan et al. | 342/67 |
| 5,631,437 A * | 5/1997 | LaVigna et al. | 89/14.3 |
| 5,827,958 A | 10/1998 | Sigler | |
| 5,837,958 A * | 11/1998 | Fornsel | 219/121.5 |
| 5,841,058 A * | 11/1998 | Manis | 89/8 |
| 6,000,163 A * | 12/1999 | Gordon | 42/119 |
| 6,032,568 A | 3/2000 | Fuller et al. | |
| 6,064,196 A | 5/2000 | Oberlin et al. | |
| 6,216,595 B1 * | 4/2001 | Lamorlette et al. | 102/270 |
| 6,295,931 B1 * | 10/2001 | Cutler et al. | 102/221 |
| 6,345,785 B1 * | 2/2002 | Harkins et al. | 244/3.23 |
| 6,559,632 B1 | 5/2003 | Anderson et al. | |
| 6,629,668 B1 * | 10/2003 | Grau et al. | 244/3.22 |
| 6,644,111 B2 * | 11/2003 | Cytron et al. | 73/167 |
| 6,669,477 B2 * | 12/2003 | Hulet | 434/14 |
| 7,021,187 B1 * | 4/2006 | Grassi | 89/6.5 |
| 7,140,574 B1 * | 11/2006 | Brunson et al. | 244/3.18 |
| 7,200,003 B2 * | 4/2007 | Hood et al. | 361/679.33 |

(Continued)

FOREIGN PATENT DOCUMENTS

GB    2397128 A    7/2004

OTHER PUBLICATIONS

International Search Report and Written Opinion mailed Jan. 30, 2012 in PCT/CA2011/001279, 10 pages.

*Primary Examiner* — Helen Kwok
(74) *Attorney, Agent, or Firm* — Kilpatrick Townsend & Stockton LLP

(57) ABSTRACT

Embodiments of the present technology are directed to systems and methods for measuring projectile muzzle velocity. A muzzle velocity sensor measures an acceleration as well as a set of events occurring within the barrel of the firearm upon a shot being fired. Using the measured data, a muzzle velocity is calculated. The muzzle velocity sensor is used externally to the firearm, requiring no changes to the firearm or the projectile.

33 Claims, 6 Drawing Sheets

(56) References Cited

U.S. PATENT DOCUMENTS

| | | | |
|---|---|---|---|
| 7,249,730 B1 * | 7/2007 | Flippen, Jr. | 244/3.15 |
| 7,703,679 B1 * | 4/2010 | Bennetts et al. | 235/454 |
| 7,802,391 B2 * | 9/2010 | Quinn et al. | 42/1.03 |
| 7,806,331 B2 * | 10/2010 | Windauer et al. | 235/404 |
| 7,947,938 B2 * | 5/2011 | Dryer | 244/3.21 |
| 8,176,667 B2 * | 5/2012 | Kamal et al. | 42/1.01 |
| 8,245,623 B2 * | 8/2012 | Weaver | 89/41.05 |
| 8,322,269 B2 * | 12/2012 | Sullivan et al. | 89/41.11 |
| 8,393,539 B2 * | 3/2013 | Ang et al. | 235/400 |
| 8,433,460 B1 * | 4/2013 | Recchia et al. | 701/7 |
| 2007/0074625 A1 * | 4/2007 | Seidensticker et al. | 89/6.5 |
| 2008/0039962 A1 * | 2/2008 | McRae | 700/90 |

\* cited by examiner

MUZZLE VELOCITY SENSOR

CROSS REFERENCES TO RELATED APPLICATIONS

This patent application claims priority to U.S. Provisional Application No. 61/416,262 filed Nov. 22, 2010 entitled "Small Arms Muzzle Velocity Sensor," which is hereby incorporated by reference in its entirety for all purposes.

BACKGROUND

The need to accurately hit a target on the first shot has become increasingly important for marksmen in the field, as a marksman may be responsible for an area of surveillance with a radius of up to 3000 meters. To achieve long range shots of upwards of 1000 meters or more, marksmen must calculate the settings that need to be dialed into a firearm scope to ensure that there is a high probability of hit on the intended target. The marksman typically uses a ballistics device to calculate the settings needed on the firearm scope for the intended impact point. The ballistics device uses a ballistics algorithm which integrates all present variables, such as range to target, slant angle, wind, temperature, altitude, humidity, barometric pressure, position on earth, etc. These variables are integrated against an assumed projectile (i.e. bullet) muzzle velocity for the particular projectile and firearm that the marksman is using. Projectile muzzle velocity is generally provided as a constant from the manufacturer of the projectile. Although every effort may be taken in the production of the bullets to produce a repeatable product with the same muzzle velocity, the actual muzzle velocity when the marksman is in the field is usually different. In fact, bullets from even the same processing batch can have muzzle velocities that differ by 5-10% depending on the conditions and manufacturing tolerances. Errors in the projectile muzzle velocity can have a significant impact on the error in the calculated impact point. Projectile muzzle velocity is the initial variable in a ballistics equation, so any error in the muzzle velocity will be amplified throughout the calculation, the error exponentially growing with an increase in target range.

While muzzle velocities may be measured in a controlled environment, such as a laboratory or a controlled range, these measured velocities may be unreliable in the field, where conditions are continually changing. Certain technologies currently exist to accurately measure the actual muzzle velocity of a projectile while in the field. However, the existing technology is impractical to use in field operations, requiring bulky and cumbersome equipment, changes to the projectile itself, and/or changes to the barrel of the firearm. For example, a chronograph may be used to measure the actual muzzle velocity. However, such devices are impractical for field operations because they require the marksman to fire through a large device placed in front of the firearm, preventing the marksman from remaining hidden.

Another existing technology, such as that disclosed in U.S. Pat. No. 4,483,190, uses sensors positioned adjacent to the path of a projectile containing magnetic material, the sensors being able to measure the magnetic field as the projectile leaves the muzzle in order to determine the muzzle velocity. However, this requires modification to the projectile itself, possibly changing certain projectile manufacturer specifications given.

Similarly, U.S. Pat. No. 6,064,196 discloses technology for measuring muzzle velocity. However, the technology requires a magnet to be placed on the projectile body. Additionally, the technology requires a sensor to be placed inside the muzzle, thereby altering the original characteristics of the firearm. Thus, there is a need for technology which accurately and efficiently calculates projectile muzzle velocity in the field without having to modify the projectile or the firearm.

Embodiments of the technology disclosed herein address these and other problems individually and collectively.

BRIEF SUMMARY

Embodiments of the present technology are directed to systems and methods for accurately calculating a projectile muzzle velocity.

One embodiment of the technology includes a method for measuring a velocity of a projectile. The method includes sensing an acceleration of a firearm in response to a shot being initiated using a first sensor mounted on an exterior of the firearm. A set of events occurring within the firearm is also sensed with a second sensor in response to the shot being initiated. The second sensor is also mounted on the exterior of the firearm. A value corresponding to a muzzle velocity of the projectile is calculated using the acceleration and the set of events occurring within the firearm. In one embodiment of the technology, a computer-readable medium has computer-readable code embodied thereon, wherein the computer-readable code includes code for performing the method described above.

Another embodiment of the technology includes a system for measuring a velocity of a projectile. The system may include two or more of various components, such as a first sensor capable of being mounted on an exterior of a firearm, a second sensor capable of being mounted on the exterior of the firearm, an analog-to-digital converter in communication with the first sensor and the second sensor, a processor in communication with the analog-to-digital converter, a ballistics device, and the firearm. The first sensor is adapted to sense an acceleration of the firearm in response to a shot being initiated. The second sensor is adapted to sense a set of events occurring within the firearm in response to the shot being initiated. The analog-to-digital converter is adapted to convert analog outputs of the first sensor and the second sensor into digital outputs. The processor is configured to calculate a value corresponding to a muzzle velocity of the projectile using the digital outputs. In one embodiment, the first sensor and the second sensor are piezoelectric sensors.

Yet another embodiment of the technology includes a method for measuring a velocity of a projectile. The method includes receiving an acceleration value corresponding to an acceleration of a firearm in response to a shot being initiated. The acceleration value is received from a first sensor that is mounted on an exterior of the firearm. A set of values corresponding to a set of events occurring within the firearm is received from a second sensor in response to the shot being initiated. The second sensor is mounted on the exterior of the firearm. A muzzle velocity value corresponding to a muzzle velocity of the projectile is calculated using the acceleration value and the set of values.

Another embodiment of the technology includes a method for measuring a velocity of a projectile from a firearm. The method includes receiving from a piezoelectric sensor a set of values corresponding to a set of events occurring within the firearm in response to a shot being initiated, the piezoelectric sensor being mounted on an exterior of the firearm. The method further includes calculating a muzzle velocity value corresponding to a muzzle velocity of the projectile using the set of values.

These and other embodiments of the technology are described in further detail below.

DETAILED DESCRIPTION

Figure 1:
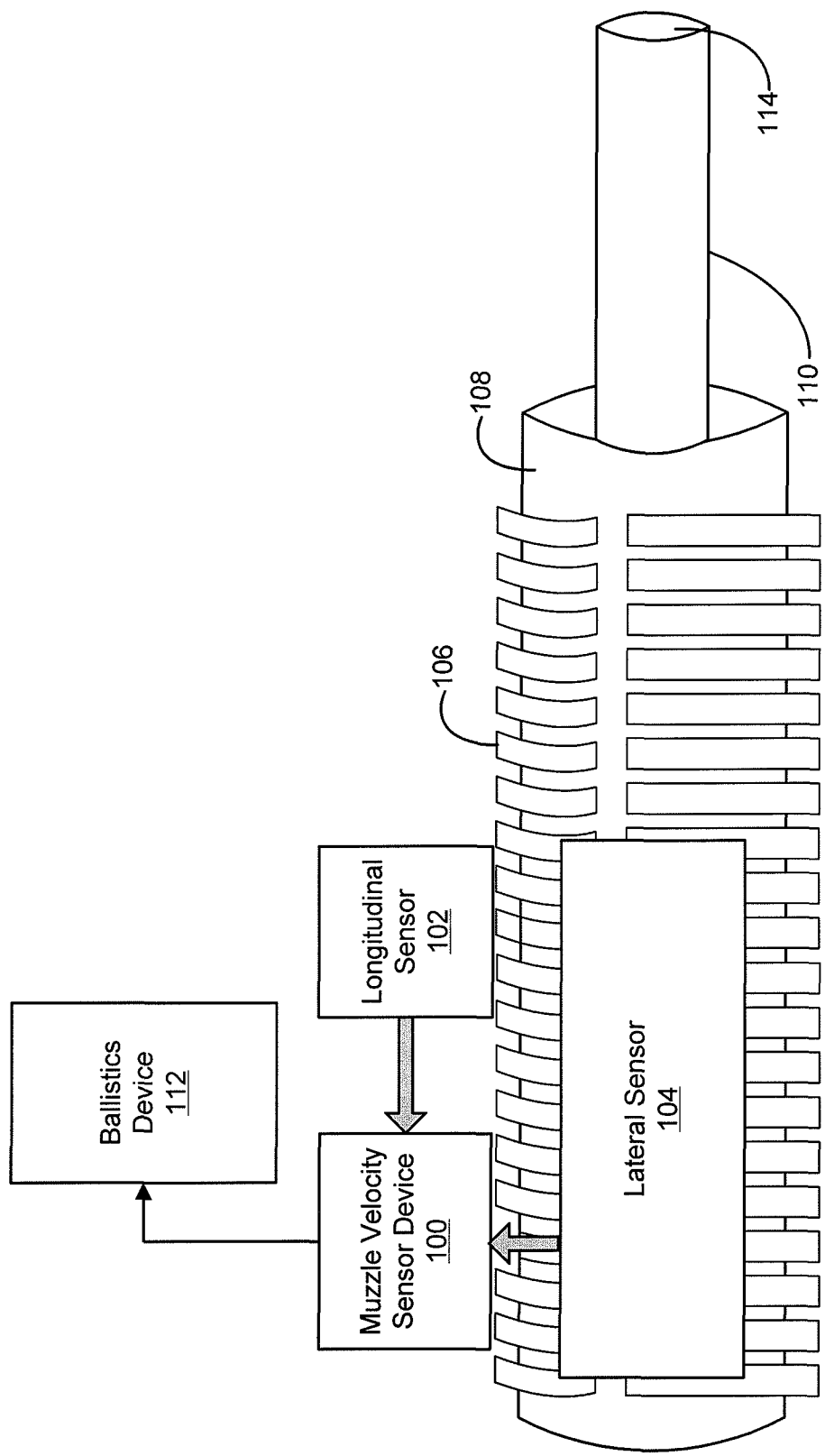
FIG. 1 depicts a firearm with a muzzle velocity sensor.

Embodiments of the technology of a muzzle velocity sensor involve the use of piezoelectric sensors placed on the exterior of a firearm. While existing technology requires modification to the firearm or to the projectile in order to measure projectile muzzle velocity, the present technology measures projectile and barrel performance for use in field operations utilizing the existing accessory rail of the firearm. The present technology does not require any modification to either the firearm or the projectile and does not require any bulky equipment that is not operationally field-deployable. The muzzle velocity sensor assists the marksman in obtaining a higher probability of hit per round by characterizing the performance of both the firearm and the projectile and by measuring the projectile muzzle velocity in the field. The muzzle velocity sensor may be applied to small arms, mortar, artillery and mobile gun platforms. The technology is scalable and may be applicable to any single-shot free-piston device such as a rifle, mortar, artillery or mobile gun system.

Embodiments of the technology utilize two or more sensors placed on the exterior of the firearm, such as on the firearm barrel. In one embodiment, the first sensor is placed laterally along the firearm barrel and the second sensor is placed longitudinally along the firearm barrel. However, the sensors can be placed in any suitable position that will give an accurate calculation of muzzle velocity according to a chosen muzzle velocity algorithm. Throughout the rest of the description, the sensors will be described as being placed laterally or longitudinally. However, embodiments of the technology should not be limited to these placements. In one embodiment of the technology, the sensors can be any suitable angular distance apart. For example, one sensor may be at a longitudinal position on the firearm, while the other sensor may be at a lateral position on the firearm (e.g. 90 degrees apart). In other embodiments, the sensors may be positioned less than 180 degrees apart. In yet another embodiment, the sensors may be at the same longitudinal or the same lateral position on the firearm and may be spaced apart by less than the length of the firearm.

In one embodiment, the sensors are piezoelectric sensors. However, any suitable sensors known in the art can be used. The sensors are placed on the exterior of the firearm, making the use of the muzzle velocity sensor less intrusive on the firearm. In one embodiment, the sensors are attached to the existing rail accessory of the firearm. Throughout the rest of the description, the sensors will be described as being placed on the rail accessory of the firearm. However, embodiments of the technology should not be limited to this placement, and the sensors can be placed on any suitable exterior portion of the firearm.

When the cartridge in the firearm is fired (i.e. when the shot is initiated), the first sensor senses an acceleration of the firearm. The second sensor senses a set of events occurring within the firearm from the time the shot is initiated to the time the projectile exits the barrel. The output of the first sensor sensing the acceleration is integrated with the output of the second sensor sensing the set of events within the firearm to confirm that the firearm has been fired and has not instead detected another rifle firing in close proximity. The outputs of the sensors are processed using a muzzle velocity sensor device where the analog signals can be converted to digital signals. Using those digital signals, the muzzle velocity sensor device calculates the projectile muzzle velocity according to a muzzle velocity algorithm described in more detail below. The calculated projectile muzzle velocity can be used in a ballistics device calibrated to the firearm parameters in order to calculate the appropriate settings needed for the intended impact point.

FIG. 1 depicts a firearm with the muzzle velocity sensor. FIG. 1 includes a portion of the firearm, which can be any weapon such as, e.g., a rifle. FIG. 1 depicts the barrel 110 of the firearm and the firearm stock 108. A standard accessory rail 106 is attached to the firearm. The accessory rail 106 is a common mounting system that standardizes the systems that can be attached to firearms. The accessory rail 106 can be any standard type of accessory rail, such as, e.g., a Picatinny or Weaver rail.

FIG. 1 also includes muzzle velocity sensor device 100, longitudinal sensor 102, and lateral sensor 104. Note that muzzle velocity sensor device 100, longitudinal sensor 102, and lateral sensor 104 can be contained within one housing or can have separate housings. In FIG. 1, muzzle velocity sensor device 100, longitudinal sensor 102, and lateral sensor 104 are attached to accessory rail 106 to ensure coupling of the mechanical energy from the firearm into the sensors. However, muzzle velocity sensor device 100, longitudinal sensor 102, and lateral sensor 104 can be attached to any suitable exterior portion of the firearm.

Lateral sensor 104 can be any suitable sensor for sensing mechanical energy. In one embodiment, lateral sensor 104 is a piezoelectric sensor that produces an electrical current when deformed by the induction of mechanical energy. A piezoelectric sensor is useful in that it may sense mechanical and chemical events occurring within the firearm from the exterior of the firearm, preventing the need to alter the firearm internally. Lateral sensor 104 can be any suitable type of piezoelectric sensor, such as those made of ceramic materials or single crystal materials (e.g. gallium phosphate, quartz, tourmaline, etc.). Lateral sensor 104 is in contact with the exterior of the firearm and detects events that occur in a firearm from the time the firing pin strikes the cartridge primer to the time the projectile exits the barrel 110. When the firearm is fired, lateral sensor 104 can sense the events by the transfer of mechanical energy from mechanical and chemical events that happen when a cartridge is fired in a firearm. Each mechanical and chemical event produces a mechanical deflection of the firearm's metal parts that in turn are transferred to lateral sensor 104. Lateral sensor 104 then converts the inputted mechanical energy from the deflection into the electrical energy (e.g. a voltage) that is ultimately outputted from lateral sensor 104.

The timing of certain events captured by lateral sensor 104 include, but are not limited to, when the firing pin contacts the primer on the cartridge, when the primer is activated, the rate at which the ammunition powder burns, when the projectile separates from the casing, the time the projectile travels down the barrel 110, the time the projectile exits the barrel 110 at the muzzle 114.

Longitudinal sensor 102 can be any suitable sensor for sensing mechanical energy. In one embodiment, longitudinal sensor 102 is a piezoelectric sensor that produces an electrical current when deformed by the induction of mechanical energy. Longitudinal sensor 102 is in contact with the exterior of the firearm and detects the rearward acceleration of the firearm along the firearm's longitudinal axis when the cartridge is fired. In one embodiment, lateral sensor 104 and longitudinal sensor 102 are contained in the same housing as muzzle velocity sensor device 100. In that embodiment, longitudinal sensor 102 is situated within muzzle velocity sensor device 100 so that it is perpendicular to the firearm barrel 110. Data from longitudinal sensor 102 is integrated with data from lateral sensor 104 in order to confirm that the firearm has actually been fired and another firearm firing in close proximity has not instead been detected, which can be useful in the field. However, in other embodiments, muzzle velocity sensor device 100 may operate without longitudinal sensor 102. Such embodiments may be useful in closed environments where other firearms being fired is not an issue.

Muzzle velocity sensor device 100 is in communication with both lateral sensor 104 and longitudinal sensor 102 and converts the outputs of lateral sensor 104 and longitudinal sensor 102 from analog signals to digital signals. Muzzle velocity sensor device 100 uses the converted digital signals from lateral sensor 104 in a muzzle velocity algorithm for calculating projectile muzzle velocity. This algorithm will be described in more detail below. Muzzle velocity sensor device 100 also integrates the converted digital signals from longitudinal sensor 102 with the converted digital signals from lateral sensor 104 in order to confirm that the firearm has been fired and another firearm firing in close proximity has not instead been detected. Muzzle velocity sensor device 100 is capable of calculating the projectile muzzle velocity as the projectile exits the barrel of the firearm or as the projectile exits a barrel termination device (e.g. a flash suppressor).

Once the projectile velocity at the muzzle 114 has been calculated by muzzle velocity sensor device 100, the calculated value of the muzzle velocity is sent to ballistics device 112. Ballistics device 112 can be any suitable computing device for predicting the impact point or target of the next projectile fired from the firearm. Ballistics device 112 includes software for importing the calculated value for muzzle velocity and uses that value to predict the impact point of the next projectile. Ballistics device 112 can be connected to or in communication with muzzle velocity sensor device 100 by any suitable means, such as via, e.g. a wireless connection (e.g. Bluetooth, WiFi 802.11, etc.), a USB port, etc.

Figure 2:
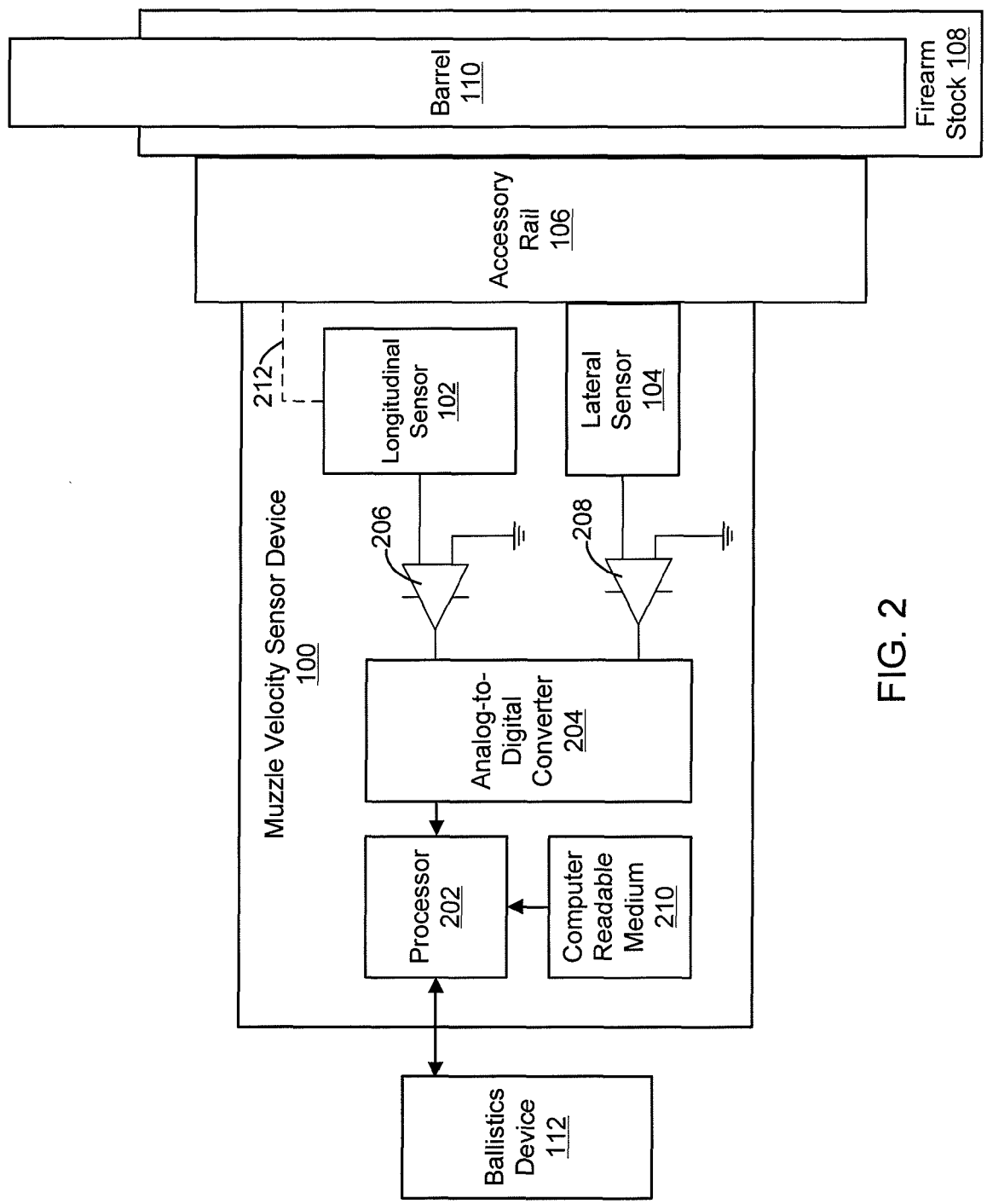
FIG. 2 depicts a schematic diagram of the firearm with the muzzle velocity sensor.

FIG. 2 is a schematic diagram of a firearm with the muzzle velocity sensor. As shown in FIG. 2, longitudinal sensor 102 and lateral sensor 104 are located within muzzle velocity sensor device 100. However, longitudinal sensor 102 and lateral sensor 104 may also be located external to muzzle velocity sensor device 100. Additionally, although not shown in FIG. 2, muzzle velocity sensor device 100 may also contain a power source.

Similar to FIG. 1, longitudinal sensor 102 and lateral sensor 104 are attached to the exterior of the firearm through accessory rail 106 in order to sense events occurring within firearm stock 108 and barrel 110. Longitudinal sensor 102 is attached to accessory rail 106 longitudinally along the firearm. That is, longitudinal sensor 102 makes contact 212 with rail accessory 106 by being situated within muzzle velocity sensor device 100 so that it is perpendicular to barrel 110. Lateral sensor 104 is attached to accessory rail 106 laterally along the firearm. The outputs of longitudinal sensor 102 and lateral sensor 104 are sent to analog-to-digital converter (ADC) 204 via operational amplifiers 206 and 208, respectively. Operational amplifiers 206 and 208 are used to match impedances and voltage levels of longitudinal sensor 102 and lateral sensor 104 to ADC 204. ADC 204 converts and stores the outputs of longitudinal sensor 102 and lateral sensor 104 to a digital format that is time-base stamped. This data can then be used by a muzzle velocity algorithm to calculate muzzle velocity.

The muzzle velocity algorithm may reside within processor 202 or may be read by processor 202 from computer readable medium 210. As shown in FIG. 2, muzzle velocity sensor device 100 includes computer-readable medium 210 having computer-readable code for performing the muzzle velocity algorithm. The computer-readable code may be read by processor 202 so that processor 202 can perform the muzzle velocity algorithm. Processor 202 may be any suitable processor, such as, e.g., an open multimedia application platform (OMAPS) processor. Processor 202 interfaces with ADC 204 to receive and read the data captured on ADC 204 from the last shot and calculate the muzzle velocity using the muzzle velocity algorithm. More details about the muzzle velocity algorithm will be described below. The data outputted from processor 202 can be displayed in either a unit numerical value of muzzle velocity (e.g. 3000 ft/sec) or as a graphical representation, such as that shown in FIG. 5.

Once the muzzle velocity is calculated by processor 202, the resultant data is transferred from processor 202 to ballistics device 112. As previously described, ballistics device 112 is any suitable computing device that can be in communication with muzzle velocity sensor device 100 in any suitable form, such as, e.g. a USB connection. Ballistics device 112 uses a ballistics algorithm, which takes into account the muzzle velocity, in order to predict the aim-point for the desired shot.

Figure 3:
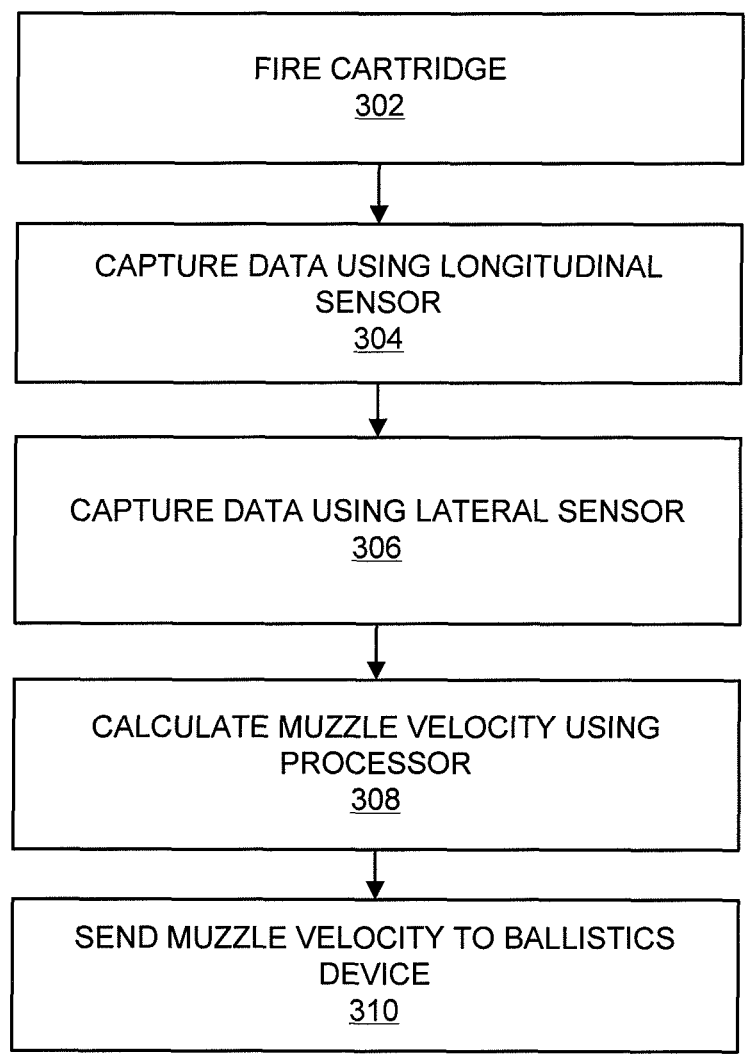
FIG. 3 depicts an illustrative method for calculating a projectile muzzle velocity.

FIG. 3 is a flowchart for a method of calculating the projectile muzzle velocity. At step 302, the cartridge is fired. When the cartridge is fired, longitudinal sensor 102 captures the rearward acceleration of the firearm (step 304) in response to the shot being initiated. Lateral sensor 104 simultaneously captures data related to a set of events occurring in the firearm in response to the shot being initiated (step 306).

Figure 4:
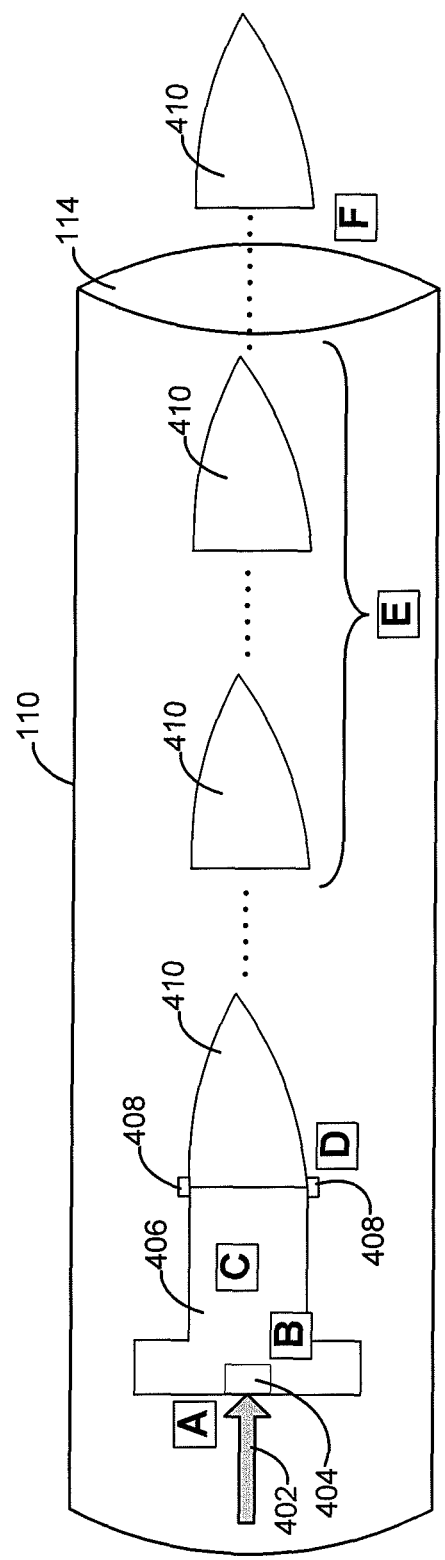
FIG. 4 depicts an illustrative set of events occurring within the barrel of the firearm.

FIG. 4 illustrates the set of events that is captured by lateral sensor 104. After the trigger on the firearm is pulled, the firing pin 402 makes contact with primer 404 on the cartridge (event A). Immediately thereafter, the primer 404 is activated and the ammunition powder within the casing 406 begins to burn (event B). The ammunition powder within the casing 406 of the cartridge burns for a period of time before the projectile 410 separates from the casing 406, which is measurable by lateral sensor 104 (event C). After sufficient pressure has built up from the ammunition powder burning, the crimping 408 on the cartridge is unable to hold under the pressure and the projectile 410 is separated from the casing 406 (event D). The projectile 410 travels down the length of the barrel 110 for a period of time which is measurable by lateral sensor 104 (event E). The projectile 410 then ultimately exits the muzzle 114 (event F). The events depicted in FIG. 4 are captured by lateral sensor 104.

Returning to FIG. 3, the events captured by longitudinal sensor 102 and lateral sensor 104 are then sent to processor 202 via operational amplifiers 206 and 208 and ADC 204. Processor 202 calculates muzzle velocity using the muzzle velocity algorithm (step 308).

Figure 5:
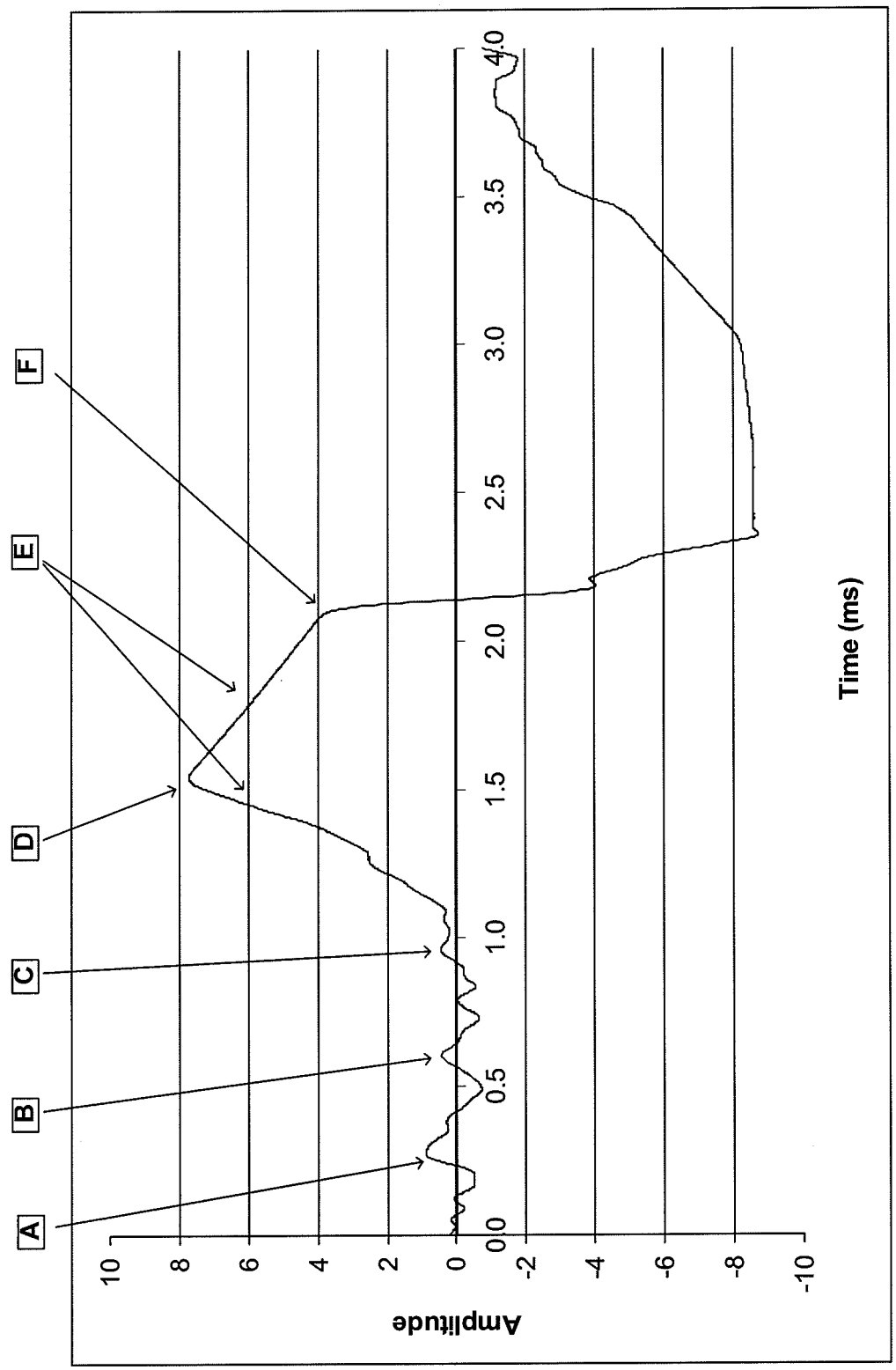
FIG. 5 depicts a graph having an illustrative indication of the times at which a set of events occurs within the firearm.

The muzzle velocity algorithm can be described with reference to FIG. 5, which shows an illustrative data set produced by a lateral sensor of a weapon under test, and which shows where in time each event (A-F) occurred. The muzzle velocity algorithm is calibrated to the specific firearm configuration used at the time the measured projectile 410 was fired. This includes calibrating the muzzle velocity algorithm for the firearm barrel length minus the length of the projectile's insertion into the barrel 100, since this is the distance the projectile 410 travels in the time frame measured by lateral sensor 104. Because the velocity of the projectile 410 is not constant down the barrel 110, the velocity (i.e. distance divided by time) is determined from the ammunition powder burn rate. The ammunition powder burn rate is calculated as the area under the curve from the cartridge primer activation (event B) through the ammunition powder burn in the cartridge (event C) to the projectile 410 exit from the barrel 110 (event F). The muzzle velocity algorithm uses the known barrel length, the time the projectile 410 travels down the barrel (event E), and the calculated ammunition powder burn rate to calculate a value for the projectile muzzle velocity. As is well known in the art, muzzle velocity is dependant upon such factors such as ammunition power burn rate, the mass of the projectile, the barrel length, and the quantity of the ammunition powder. Therefore, one of ordinary skill in the art can calculate the muzzle velocity when these are known. Embodiments of the technology can accurately characterize the velocity of the projectile as it travels down the barrel of the firearm.

Returning to FIG. 3, once the projectile muzzle velocity is calculated, it is sent to ballistics device 112 which is in communication with muzzle velocity sensor device 100 (step 310). Ballistics device 112 can use the calculated projectile muzzle velocity to predict the target of a subsequent projectile shot from the firearm.

Figure 6:
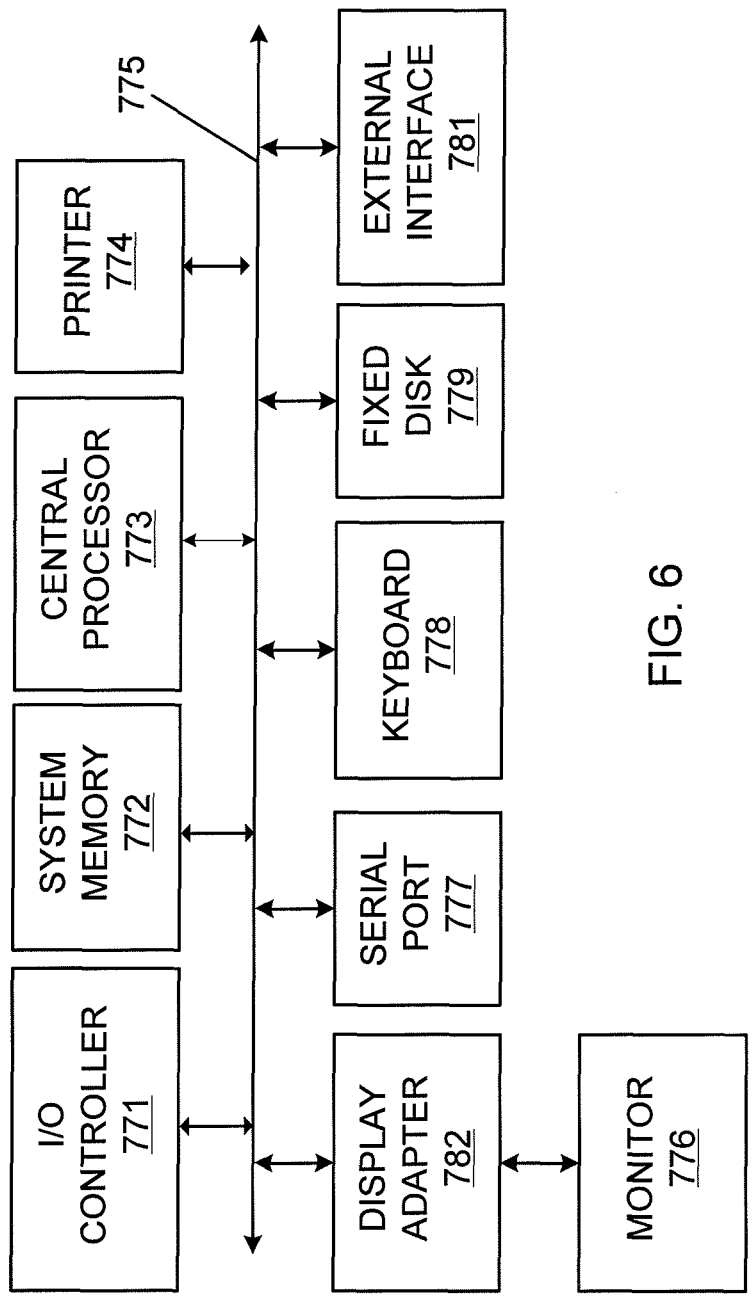
FIG. 6 depicts a block diagram of an illustrative computer system.

The various participants in the present technology (e.g., muzzle velocity sensor device 100, ballistics device 112, processor 202) may operate one or more computer apparatuses to facilitate the functions described herein. Any of those elements may use any suitable number of subsystems to facilitate the functions described herein. Examples of such subsystems or components are shown in FIG. 6. The subsystems shown in FIG. 6 are interconnected via a system bus 775 and powered by any suitable power source. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

It should be understood that the present technology as described above can be implemented in the form of control logic using computer software in a modular or integrated manner. Based on the disclosure and teachings provided herein, a person of ordinary skill in the art will know and appreciate other ways and/or methods to implement the present technology using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

One or more features from any embodiment may be combined with one or more features of any other embodiment without departing from the scope of the technology.

A recitation of "a", "an" or "the" is intended to mean "one or more" unless specifically indicated to the contrary.

What is claimed is:

1. A method of measuring a velocity of a projectile, comprising:
    sensing an acceleration of a firearm in response to a shot being initiated, the sensing being performed with a first sensor being mounted on an exterior of the firearm;
    sensing a set of events occurring within the firearm in response to the shot being initiated, the sensing being performed with a second sensor being mounted on the exterior of the firearm, wherein the set of events include at least an activation of a primer of a cartridge within the firearm and a projectile exit from a barrel of the firearm;
    integrating data from the first sensor with data from the second sensor to determine whether the firearm has been fired; and
    calculating a value corresponding to a muzzle velocity of the projectile using the set of events occurring within the firearm.

2. The method of claim 1, wherein the first sensor and the second sensor are piezoelectric sensors.

3. The method of claim 1, wherein the first sensor is mounted longitudinally along the firearm and is configured to sense a rearward acceleration of the firearm.

4. The method of claim 1, wherein the second sensor is mounted laterally along the firearm, wherein the second sensor senses mechanical energy along an axis that is perpendicular to a rearward acceleration of the firearm.

5. The method of claim 1, wherein the first sensor and the second sensor are mounted on an accessory rail of the firearm.

6. The method of claim 1, wherein calculating includes calculating the value corresponding to the muzzle velocity using parameters associated with the firearm.

7. The method of claim 6, wherein the parameters associated with the firearm include a length of the barrel of the firearm.

8. The method of claim 1, wherein the sensing the set of events includes sensing when a firing pin of the firearm contacts the primer of the cartridge within the firearm.

9. The method of claim 1, wherein the sensing the set of events includes sensing ammunition powder burning in the cartridge within the firearm.

10. The method of claim 1, wherein the sensing the set of events includes sensing a separation of the projectile from a casing of a cartridge within the firearm.

11. The method of claim 1, wherein the sensing the set of events includes sensing the projectile traveling through a barrel of the firearm.

12. The method of claim 1, further comprising:
sending the value corresponding to the muzzle velocity to a ballistics device, the ballistics device predicting a target of a subsequent projectile using the value.

13. A system for measuring a velocity of a projectile, comprising:
a first sensor capable of being mounted on an exterior of a firearm wherein the first sensor is adapted to sense an acceleration of the firearm in response to a shot being initiated;
a second sensor capable of being mounted on the exterior of the firearm wherein the second sensor is adapted to sense a set of events occurring within the firearm in response to the shot being initiated, wherein the set of events include at least an activation of a primer of a cartridge within the firearm and a projectile exit from a barrel of the firearm;
an analog-to-digital converter in communication with the first sensor and the second sensor, wherein the analog-to-digital converter is adapted to convert analog outputs of the first sensor and the second sensor into digital outputs; and
a processor in communication with the analog-to-digital converter, wherein the processor is configured to:
integrate data from the first sensor with data from the second sensor to determine whether the firearm has been fired; and
calculate a value corresponding to a muzzle velocity of the projectile using the data from the second sensor.

14. The system of claim 13, wherein the first sensor and the second sensor are piezoelectric sensors.

15. The system of claim 13, wherein the first sensor is capable of being mounted longitudinally along the firearm and is capable of sensing rearward acceleration along a longitudinal axis of the firearm.

16. The system of claim 13, wherein the second sensor is capable of being mounted laterally along the firearm, wherein the second sensor is capable of sensing mechanical energy along an axis that is perpendicular to a rearward acceleration of the firearm.

17. The system of claim 13, wherein the first sensor and the second sensor are capable of being mounted on an accessory rail of the firearm.

18. The system of claim 13, wherein the processor is adapted to calculate the value corresponding to the muzzle velocity using parameters associated with the firearm.

19. The system of claim 13, further comprising:
a ballistics device in communication with the processor, wherein the ballistics device is configured to predict a target of a subsequent projectile using the value corresponding to the muzzle velocity.

20. The system of claim 13, wherein the second sensor is capable of sensing when a firing pin of the firearm contacts the primer of the cartridge within the firearm.

21. The system of claim 13, wherein the second sensor is capable of sensing ammunition powder burning in the cartridge within the firearm.

22. The system of claim 13, wherein the second sensor is capable of sensing a separation of the projectile from a casing of the cartridge within the firearm.

23. The system of claim 13, wherein the second sensor is capable of sensing the projectile traveling through the barrel of the firearm.

24. A method for measuring a velocity of a projectile, comprising:
receiving from a first sensor an acceleration value corresponding to an acceleration of a firearm in response to a shot being initiated, the first sensor being mounted on an exterior of the firearm;
receiving from a second sensor a set of values corresponding to a set of events occurring within the firearm in response to the shot being initiated, wherein the set of events include at least an activation of a primer of a cartridge within the firearm and a projectile exit from the barrel, the second sensor being mounted on the exterior of the firearm;
integrating data from the first sensor with data from the second sensor to determine whether the firearm has been fired; and
calculating a muzzle velocity value corresponding to a muzzle velocity of the projectile using the set of values.

25. The method of claim 24, wherein the first sensor and the second sensor are piezoelectric sensors.

26. The method of claim 24, wherein the first sensor is mounted longitudinally along the firearm and is configured to sense a rearward acceleration of the firearm.

27. The method of claim 24, wherein the second sensor is mounted laterally along the firearm, wherein the second sensor senses mechanical energy along an axis that is perpendicular to a rearward acceleration of the firearm.

28. The method of claim 24, wherein the first sensor and the second sensor are mounted on an accessory rail of the firearm.

29. The method of claim 24, wherein the step of calculating includes calculating the muzzle velocity value using parameters associated with the firearm.

30. The method of claim 24, further comprising:
sending the muzzle velocity value to a ballistics device, the ballistics device predicting a target of a subsequent projectile using the muzzle velocity value.

31. A system for measuring a velocity of a projectile from a firearm, comprising:
a piezoelectric sensor capable of being mounted on an exterior of the firearm wherein the piezoelectric sensor is adapted to sense a set of events occurring within the firearm in response to a shot being initiated, wherein the set of events include at least an activation of a primer of a cartridge within the firearm and a projectile exit from a barrel of the firearm;
an analog-to-digital converter in communication with the piezoelectric sensor, wherein the analog-to-digital converter is adapted to convert analog outputs associated with the set of events of the piezoelectric sensor into digital outputs; and
a processor in communication with the analog-to-digital converter, wherein the processor is configured to calculate a value corresponding to a muzzle velocity of the projectile using the digital outputs.

32. A method for measuring a velocity of a projectile from a firearm, comprising:
receiving from a piezoelectric sensor a set of values corresponding to a set of events occurring within the firearm in response to a shot being initiated, the piezoelectric sensor being mounted on an exterior of the firearm, wherein the set of events include at least an activation of a primer of a cartridge within the firearm and a projectile exit from a barrel of the firearm; and calculating a muzzle velocity value corresponding to a muzzle velocity of the projectile using the set of values.

33. A computer-readable medium having computer-readable code embodied thereon, the computer-readable code capable of being read by a processor and including code for a method comprising:

sensing an acceleration of a firearm in response to a shot being initiated, the sensing being performed with a first sensor being mounted on an exterior of the firearm;

sensing a set of events occurring within the firearm in response to the shot being initiated, the sensing being performed with a second sensor being mounted on the exterior of the firearm, wherein the set of events include at least an activation of a primer of a cartridge within the firearm and a projectile exit from a barrel of the firearm;

integrating data from the first sensor with data from the second sensor to determine whether the firearm has been fired; and calculating a value corresponding to a muzzle velocity of the projectile using the set of events occurring within the firearm.

\* \* \* \* \*